(12) United States Patent
De Souza et al.

(10) Patent No.: US 11,987,358 B2
(45) Date of Patent: May 21, 2024

(54) TOWPLATE UNITS FOR AERIAL CARGO DELIVERY AND ASSEMBLIES INCLUDING THE SAME

(71) Applicant: EMBRAER S.A., São José dos Campos (BR)

(72) Inventors: Heron Medeiros De Souza, São José dos Campos (BR); Saint Clair Trisotto, São José dos Campos (BR); Marcos Antônio Batista Goncalves, São José dos Campos (BR); Guilherme Augusto Garcia Borges, São José dos Campos (BR); Vinicius Mira Santos, São José dos Campos (BR); Torben Allert, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 225 days.

(21) Appl. No.: 17/719,999

(22) Filed: Apr. 13, 2022

(65) Prior Publication Data
US 2023/0331385 A1 Oct. 19, 2023

(51) Int. Cl.
*B64D 1/12* (2006.01)
*B64D 17/38* (2006.01)

(52) U.S. Cl.
CPC .............. *B64D 1/12* (2013.01); *B64D 17/38* (2013.01)

(58) Field of Classification Search
CPC .... B64D 1/02; B64D 1/08; B64D 1/12; B64C 1/20; B64C 1/1415
See application file for complete search history.

(56) References Cited

U.S. PATENT DOCUMENTS

| | | |
|---|---|---|
| 3,801,051 A | 4/1974 | Hosterman et al. |
| 4,303,213 A * | 12/1981 | Bolender ................. B64D 1/12 244/151 B |
| 4,398,686 A | 8/1983 | Leger et al. |
| 4,428,551 A | 1/1984 | Woram et al. |
| 4,651,957 A | 3/1987 | Minnich, II |

\* cited by examiner

*Primary Examiner* — Joshua J Michener
*Assistant Examiner* — Ka Chun Leung
(74) *Attorney, Agent, or Firm* — NIXON & VANDERHYE P.C.

(57) ABSTRACT

Towplate units and assemblies are disclosed for airborne extraction of a cargo load. The towplate unit includes an extraction and jettison links having a pair of spaced-apart parallel extraction and jettison link arms and an extraction and jettison cross-connector extending between and rigidly joining the extraction and jettison link arms, respectively. A locking system removably locks the jettison link to the extraction link to thereby allow the jettison link to be removed from the extraction link when unlocked. A towplate assembly is also provided which includes a towplate unit removably assembled with a deck plate and an actuator control assembly operatively interconnected to the towplate unit so as to cause the towplate unit to separate from the deck plate during a normal cargo deployment condition or to cause the jettison link to separate from the extraction link of the towplate unit during an aborted cargo deployment condition.

20 Claims, 15 Drawing Sheets

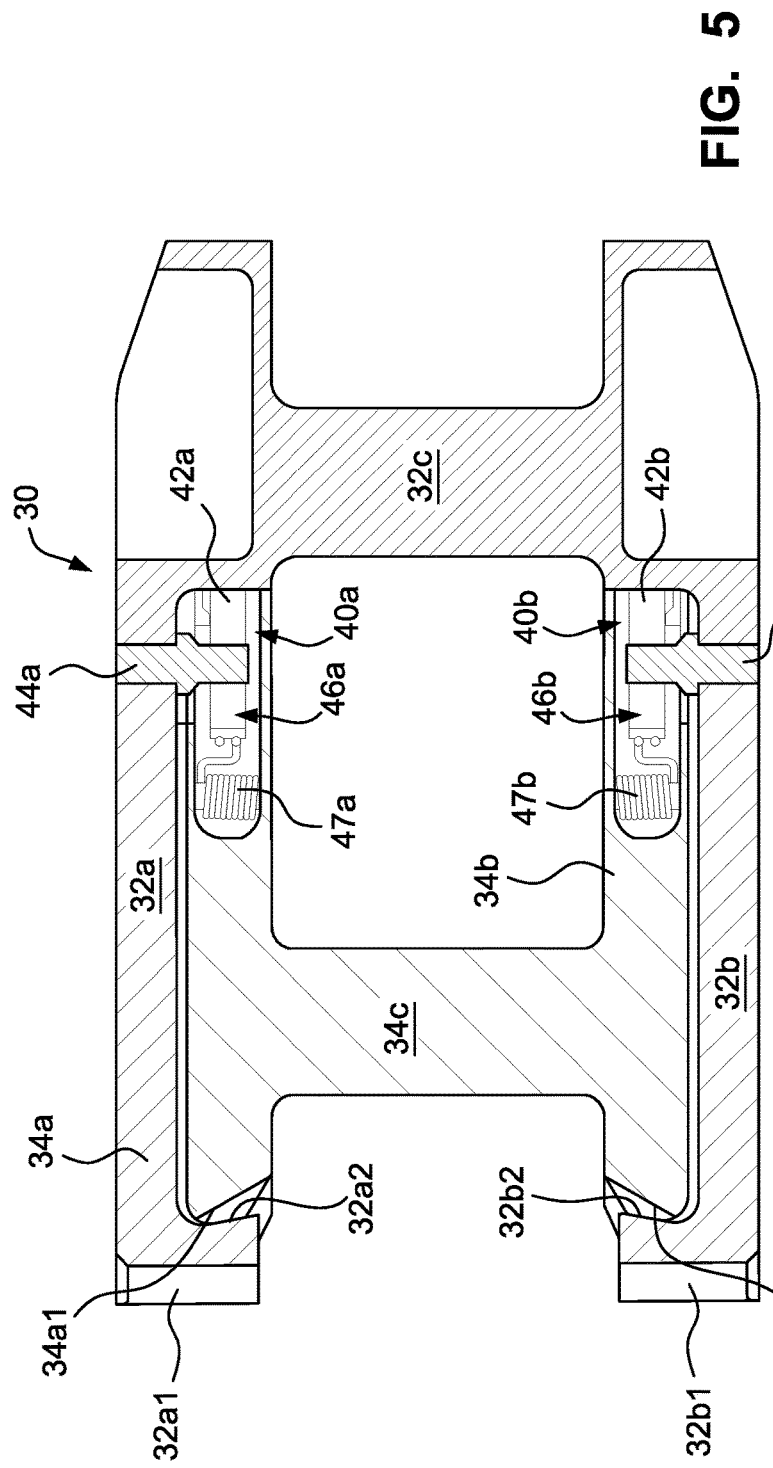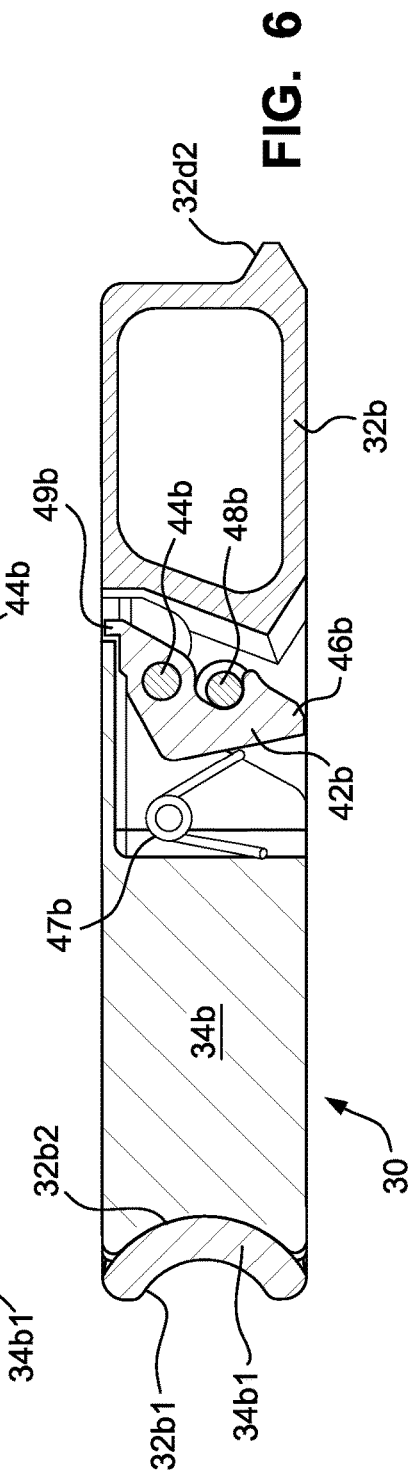
FIG. 5
FIG. 6

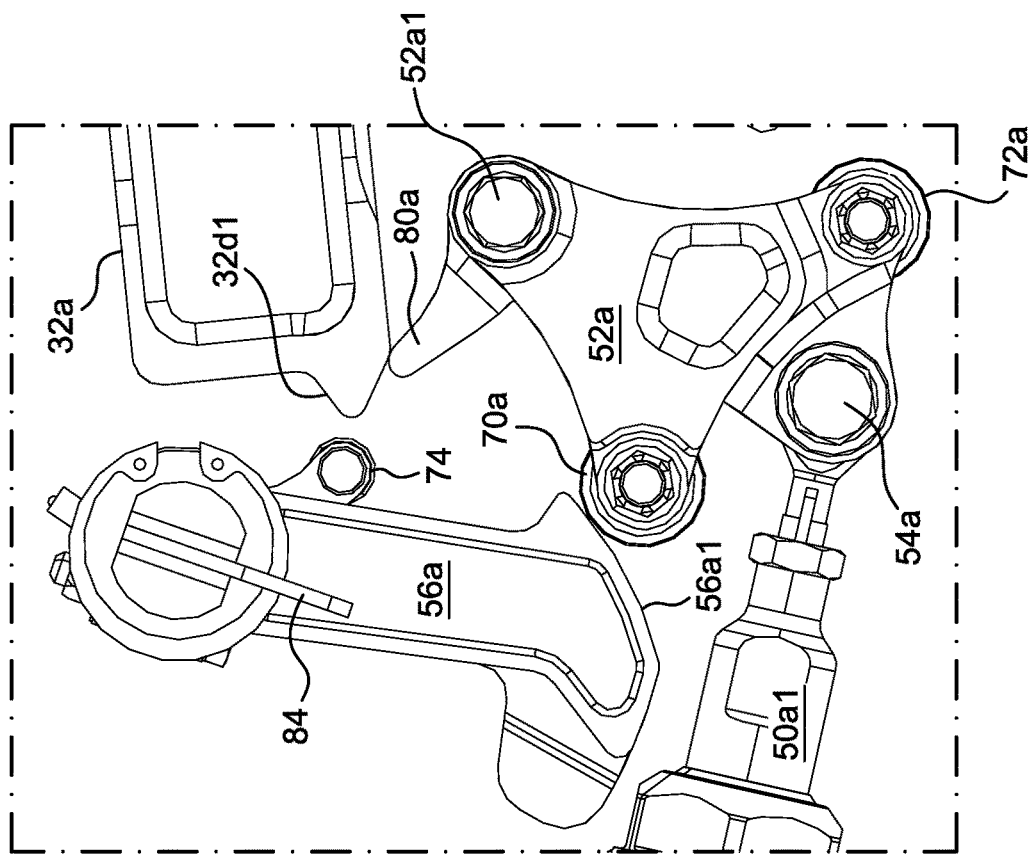
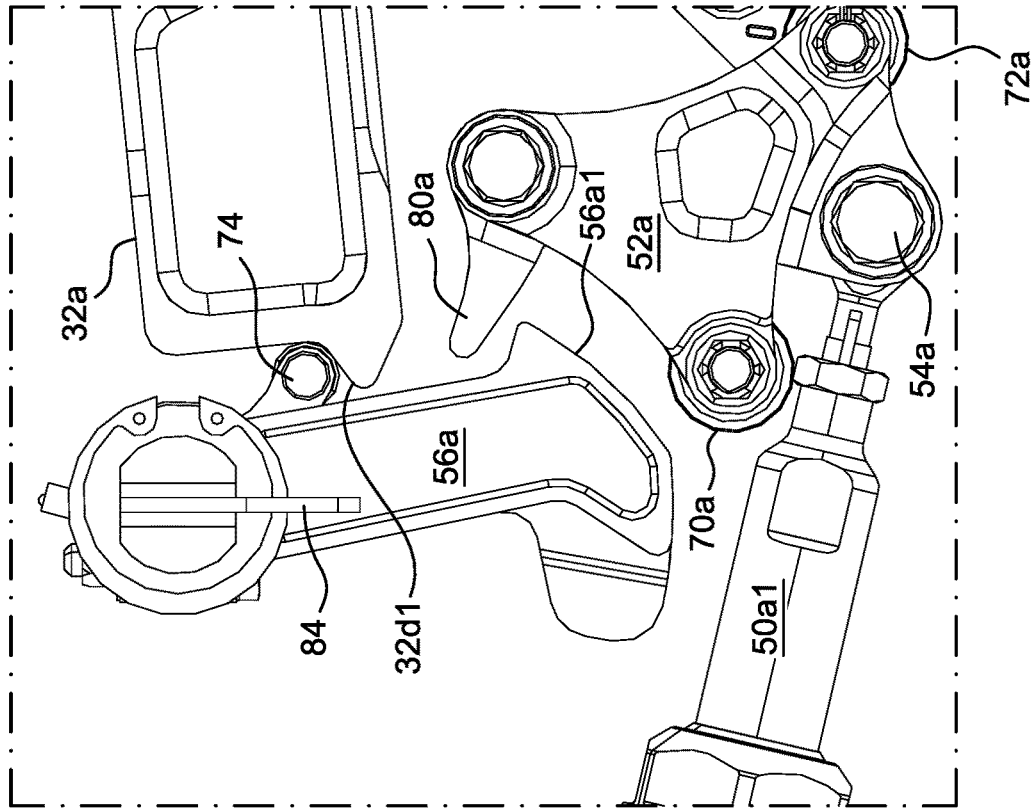

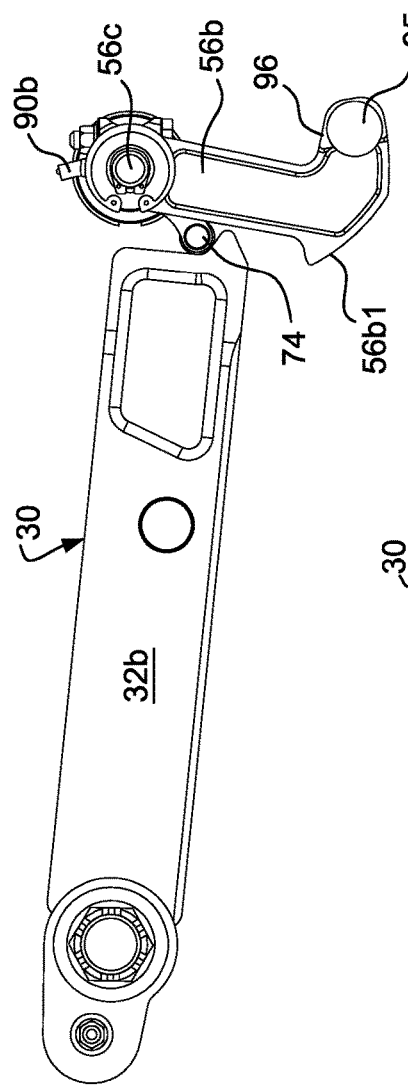
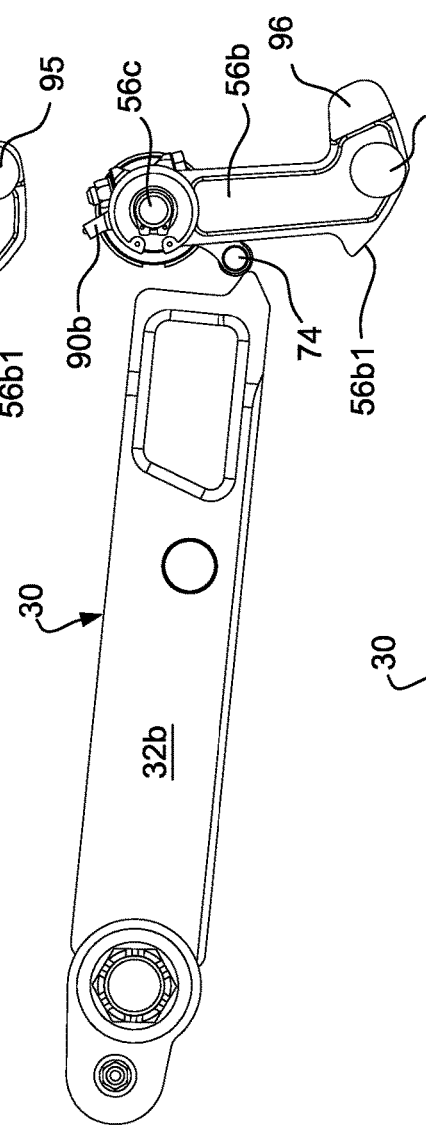
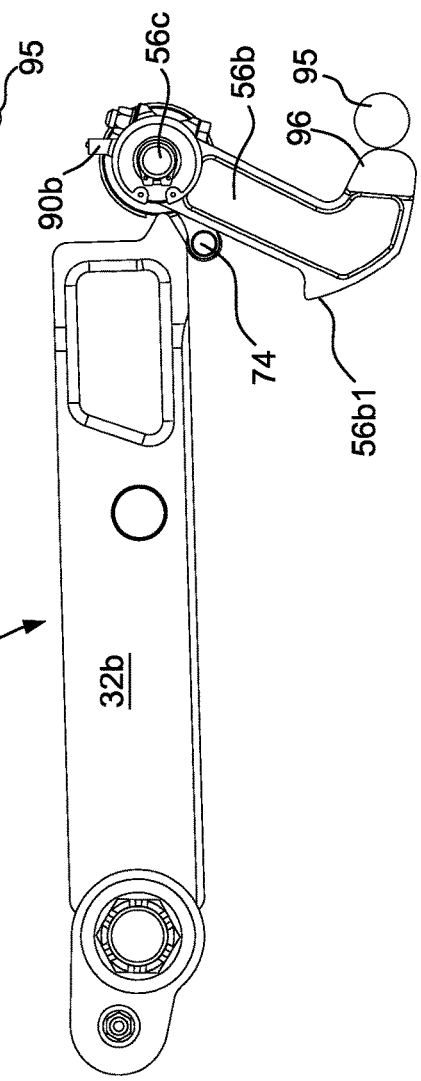

TOWPLATE UNITS FOR AERIAL CARGO DELIVERY AND ASSEMBLIES INCLUDING THE SAME

FIELD

The embodiments disclosed herein relate generally to parachute-assisted systems for the airborne delivery of cargo loads from a cargo aircraft. More specifically, the embodiments disclosed herein relate to towplate units and assemblies employed in parachute-assisted airborne cargo delivery systems whereby the towplate unit is used to tow a drogue parachute (colloquially known as a "drogue chute") during the airborne cargo delivery and then transfer the pulling force of the drogue chute to a bridle associated operatively with an extraction parachute and line bag attached to the towplate. The extraction line associated with the extraction parachute and line bag is in turn connected to the cargo load to be extracted from the aircraft. Thus, when the towplate unit separates from the aircraft the extraction parachute will be deployed which subsequently causes the cargo load to be extracted from the cargo aircraft.

BACKGROUND

Towplates are well known components of parachute-assisted airborne cargo delivery systems associated with cargo aircraft as evidenced by U.S. Pat. Nos. 3,801,051, 4,398,686, 4,428,551 and 4,651,957 (the entire contents of each being expressly incorporated hereinto by reference). In general, several of the known towplate proposals have locking concepts, either for a cargo extraction (normal) function or for an abort (jettison) function, which require high actuation forces to overcome the friction involved during unlocking of the mechanisms. These prior proposed structures thereby demand larger and more expensive actuators in addition to leading to reduced component lifetimes and increasing the possibility of become jammed which in turn translates to mission loss.

In addition, some prior towplate proposals do not employ robust component concepts relying instead on structural features such as ball-locking or sacrificial/fuse parts. While more commonly used towplates have components that have somewhat improved the normal cargo release function, there is still problems encountered during the jettison function. Further, the number of actuators needed for conventional towplates to ensure functional redundancy include two actuators for the release function and two actuators for the jettison function thereby making the overall cargo delivery system more complex and expensive.

A further issue with conventional towplate assemblies concerns the ease of system setup. In this regard, conventional towplates require detailed assembly, typically with the use of tools, and are therefore more time-consuming to be operatively positioned within the cargo aircraft and armed for cargo delivery. Conventional towplates also do not employ any sensor monitoring system and/or visual indications so as to provide the towplate setup easier and render the overall cargo delivery system safer.

It would therefore be highly desirable if a robust yet simplified cargo towplate could be provided which address some if not all of the problems identified above with respect to conventional towplate assemblies. It is towards fulfilling such a need that the embodiments disclosed herein are directed.

SUMMARY OF DISCLOSED EMBODIMENTS

Broadly, the embodiments disclosed herein are directed toward towplate units and assemblies employed in parachute-assisted airborne cargo delivery systems whereby the towplate unit is used to tow a drogue chute during the airborne cargo delivery and then transfer the pulling force of the drogue chute to a bridle associated operatively with an extraction parachute and line bag attached to the towplate. The extraction line associated with the extraction parachute and line bag is in turn connected to the cargo load to be extracted from the aircraft. Thus, when the towplate unit separates from the aircraft the extraction parachute will be deployed which subsequently causes the cargo load to be extracted from the cargo aircraft. In accordance with certain embodiments, therefore, the towplate unit will include an extraction link having a pair of spaced-apart parallel extraction link arms and an extraction cross-connector extending between and rigidly joining the extraction link arms. A jettison link is also provided having a pair of spaced-apart parallel jettison link arms each nested within a respective one of the extraction link arms, and a jettison cross-connector extending between and rigidly joining the jettison link arms rearwardly of the extraction cross-connector. A locking system of the towplate unit will thus removably lock the jettison link to the extraction link to thereby allow the jettison link to be removed from the extraction link when unlocked (e.g., during an aborted cargo deployment condition).

The locking system may include (i) at least one (preferably a pair of) locking link(s) each pivotally connected to a respective one of the jettison link arms, and (ii) at least one (preferably a pair of) locking pin(s) each being rigidly associated with a respective one of the extraction link arms. The locking links will normally be in a locked condition where the locking links are lockably engaged with a respective one of the locking pins. As such, the extraction and jettison links are connected to one another while in such normal condition and are pivotally moveable into an unlocked condition whereby the locking links are disengaged with the respective one of the locking pins to thereby allow the jettison link to be removably separated from the extraction link. The locking system may therefore further comprise a spring element, e.g., a torsion spring, for exerting a bias force on the locking links in a direction to pivot the locking links into the engaged position thereof.

According to some embodiments, the extraction link arms may include an aft-facing end which defines an inner convexly curved surface. The jettison link arms may thus include an aft facing end which defines an outer concavely curved surface which is engaged with the inner convexly curved surface of a respective one of the jettison link arms. Such cooperatively engaged curved surfaces will therefore allow the jettison link arms to essentially pivotally separate from the extraction link arms when the locking system is unlocked. The aft-facing end of the extraction link arms may further define an outer concavely curved surface to cooperate with a convexly curved surface of a mounting boss associated with a deck plate in which the towplate unit may be positioned.

The towplate unit described briefly above may be provided as a part of a towplate assembly whereby the towplate unit is removably coupled to a deck plate which is adapted to being immovably attached to the cargo deck of the cargo aircraft. An actuator control assembly is thereby provided to removably lock the towplate unit to the deck plate. The actuator control assembly is operatively interconnected to the towplate unit so as (i) to cause the towplate unit to separate from the deck plate during a normal cargo deployment condition in response to the actuator control assembly being in a cargo extraction state or (ii) to cause the jettison link to separate from the extraction link of the towplate unit during an aborted cargo deployment condition in response to the actuator control assembly being in a jettison state.

Certain embodiments of the actuator control assembly will include an electromechanical, hydraulic or pneumatic actuator cylinder having a linearly operable actuator shaft that is reciprocally moveable from an intermediate (locked) position and into retracted and extended positions. A bell crank is operatively connected to a terminal end of the actuator shaft so as to be pivotally moveable between a towplate unit release position and a jettison link release position in response to movement of the actuator shaft between its retracted and extended positions, respectively. A pivotal extraction link trigger is also provided so as to be operatively engaged with the extraction link of the towplate unit so as to removably lock the towplate unit to the deck plate. A jettison link trigger is pivotally attached to the deck plate and adapted to being pivotally moved into engagement with the locking system to unlock the jettison link from the extraction link. A tension spring may also be operatively connected to the jettison link trigger to cause the jettison link trigger to be moved pivotally into a disengagement relative to the locking system. Thus, movement of the actuator shaft into the retracted position responsively causes the bell crank to pivot into the towplate unit release position and engage with the extraction link trigger so as to pivotally move the extraction link trigger to unlock the towplate unit from the deck plate and thereby allow the towplate unit to be separated therefrom (e.g., so as to deploy the cargo load during a normal cargo extraction condition).

Alternatively, movement of the actuator shaft into the extended position responsively causes the bell crank to pivot into the jettison link release position and engage with the jettison link trigger so as to pivotally move the jettison link trigger against the bias force of the tension spring and into contact with the locking system to thereby unlock the jettison link from the extraction link to allow the jettison link to be separated therefrom (e.g., so as to prevent the cargo load from being deployed as a result of an aborted cargo extraction condition). The extraction link trigger may be provided with an extraction link cam surface, while the jettison link trigger may be provided with a trigger link cam surface. The bell crank may thus include an extraction link roller and a jettison link roller engageable with the extraction link cam surface and the trigger link cam surface in response to the bell crank being pivotally moved into the towplate unit release position and the jettison link release position, respectively.

At least one of extraction link arms of the towplate unit may be provided with a forwardly protruding latch surface. The extraction trigger link may thus include an extraction trigger finger engaged with the latch surface to removably lock the towplate unit to the deck plate. Pivotal movement of the bell crank into the towplate unit release position will thereby responsively cause the extraction trigger link to pivot so as to disengage the extraction trigger finger and the latch surface, whereby the towplate unit may be separated from the deck plate.

The bell crank in certain embodiments may be provided with an anti-jamming finger which is adapted to contact a forward end of the extraction link when the bell crank is moved into the towplate release position to thereby ensure that the towplate unit separates from the deck plate.

Other embodiments may include a deck plate having a towplate indicator window while the extraction link trigger includes a towplate indicator boss which protrudes upwardly into the towplate indicated window. As such, the terminal end of the indicator boss will be visible through the indicator window to provide visual confirmation that the extraction link trigger is engaged with the extraction link and thus the towplate unit is removably positioned within the deck plate.

The extraction link trigger may include an extraction trigger link shaft for mounting the extraction link trigger for pivotal movements between engaged and disengaged positions relative to the extraction link. A torsion spring is thus operatively associated with the trigger link shaft for exerting a bias force to move the extraction link trigger into the engaged position thereof. The extraction trigger link shaft may also include a handle to allow manual rotation of the trigger link shaft (e.g., against the bias force of the torsion spring) and thereby cause the extraction trigger link to be manually pivoted between the engaged and disengaged positions thereof. In such embodiments, the deck plate will include an access window to allow manual access to the handle.

Further embodiments include an extraction trigger link having a sensor flange and an actuator control system further which also comprises a proximity sensor to sense proximity of the sensor flange. The proximity sensor may therefore issue a position signal in response to the extraction trigger link being in opposed proximity to the proximity sensor indicative of the extraction trigger link being removably locked with the towplate unit.

Cargo aircraft may be provided with the towplate assembly whereby the towplate assembly is immovably positioned on a cargo deck of the aircraft's cargo door. In response to signals issued by an on-board mode controller operated by an aircraft crewmember, the towplate assembly may be commanded during a normal cargo extraction condition to allow the towplate unit to separate from the deck plate and exit the aircraft to cause the cargo load to be extracted from the aircraft through the opened cargo door, or alternatively may be commanded during an abnormal cargo extraction condition to allow the jettison link to separate from the extraction link whereby extraction of the cargo load is precluded.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 5 is a cross-sectional top plan view of the towplate unit as taken along line 5-5 in FIG. 4;

FIG. 6 is a cross-sectional elevational view of the towplate unit as taken along line 6-6 in FIG. 4;

FIGS. 12A and 12B are enlarged elevational views of an anti-jamming system associated with the bell crank of the towplate unit to ensure reliable separation of the towplate unit from the aircraft when the actuator system is operated so as to be in the extraction condition;

FIGS. 16A-16C show the operative cooperation between the extraction link trigger and the proximity sensor in various operational modes of the towplate assembly.

DETAILED DESCRIPTION OF EMBODIMENTS

Figure 1:
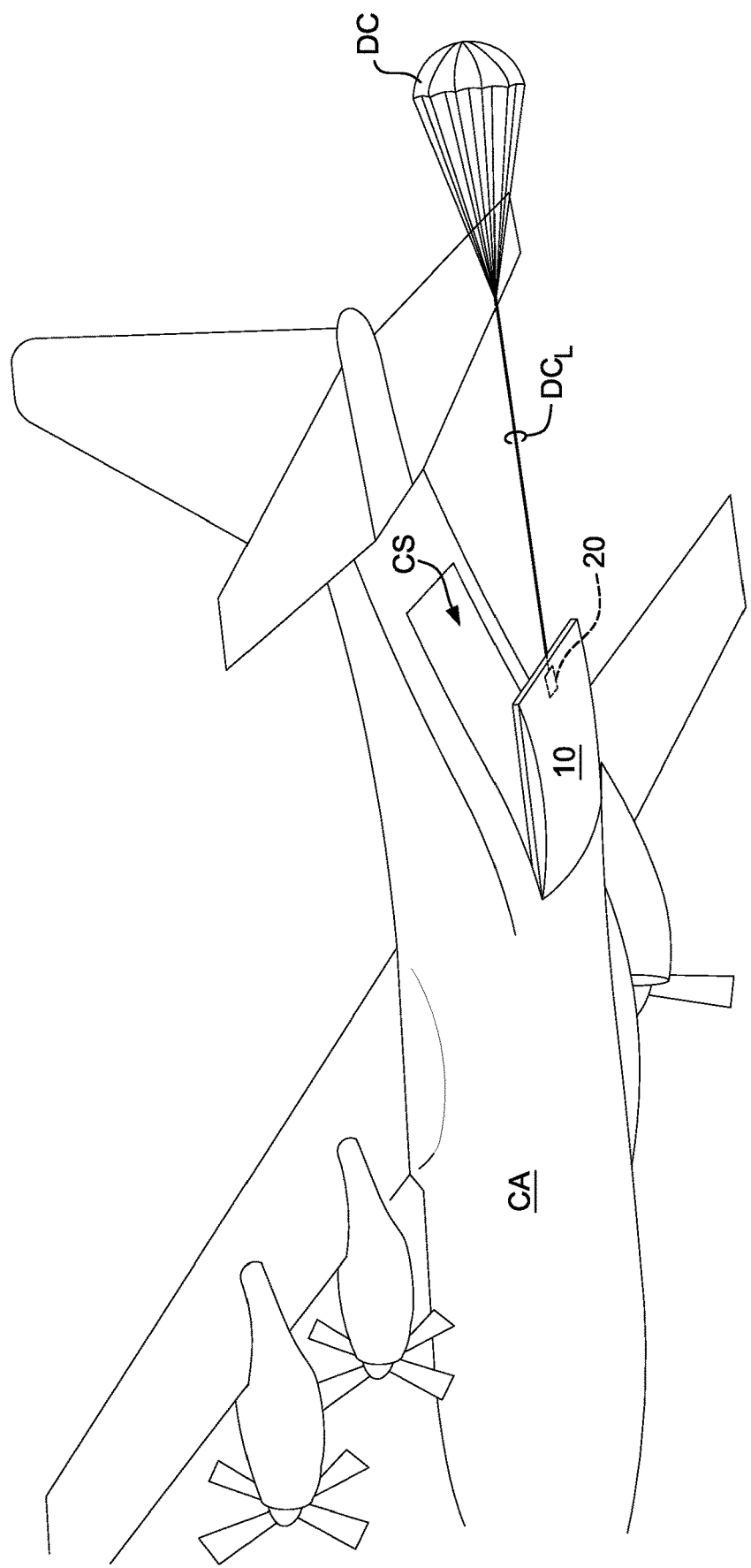
FIG. 1 is a perspective view of a cargo aircraft during an initial phase of an airborne cargo delivery mission whereby a drogue chute being towed by the aircraft is attached to a towplate positioned on the deck of the opened cargo ramp.

As briefly noted hereinabove, the embodiments disclosed herein are directed toward parachute-assisted systems for the airborne delivery of cargo from a cargo aircraft CA as depicted schematically in FIG. 1. In this regard, the cargo aircraft CA includes an aft-facing cargo door 10 having a section of a cargo deck 12 in which a towplate assembly 20 according to the embodiments disclosed herein may be operatively positioned (see FIG. 2). As is conventional, the cargo door 10 may be opened in flight so as to expose the interior cargo space CS within the cargo aircraft CA in which parachute equipped cargo (not shown) is positioned for discharge through the open cargo door when required.

The towplate assembly 20 includes a deck plate 27 for mounting the assembly 20 in a substantially flush relationship relative to the cargo deck 12. The deck plate 27 includes a deck plate 25 which supports a towplate unit 30 that is adapted to being connected operatively to the drogue chute line $DC_L$ and to a bridle line BL operatively associated with an extraction parachute and line bag EP/LB. An extraction line $CL_E$ connected operatively to the extraction parachute in the bag EP/LB extends forwardly relative to the flight direction of the cargo aircraft CA and is connected to the cargo load (not shown) within the cargo space CS of the cargo aircraft CA. In this regard, the drogue chute DC may be connected to the towplate unit 30 via the drogue chute line $DC_L$ so as to be deployed in the slip stream aft of the cargo aircraft CA. An aft end of the bridle line BL is connected to the towplate unit 30 with the bridle line BL extending forwardly relative to the flight direction of the cargo aircraft CA so as to be operatively connected to the extraction parachute and extraction line bag EP/LB in which the main parachute assembly for deployment of the cargo load (not shown) is contained. During a normal aerial deployment of the cargo load, when the towplate unit 30 of the towplate assembly 20 is released, the towplate unit 30 will exit the aircraft under the force exerted by the drogue chute DC via the attached drogue chute line $DC_L$. Thereafter the drogue chute DC will then pull the bridle line BL causing the attached extraction parachute (not shown) associated operatively within the extraction parachute and extraction line bag EP/LB to deploy. Ultimately the extraction line $CL_E$ attached at one end to the extraction parachute and at the other end to the cargo load (not shown) is pulled aftwise opposite to the flight direction thereby exiting the cargo aircraft CA through the opened cargo door CD. The main cargo parachute associated with the thus aerially deployed cargo load will then be caused to open so as to allow the cargo load to descend to the ground below.

Figure 3:
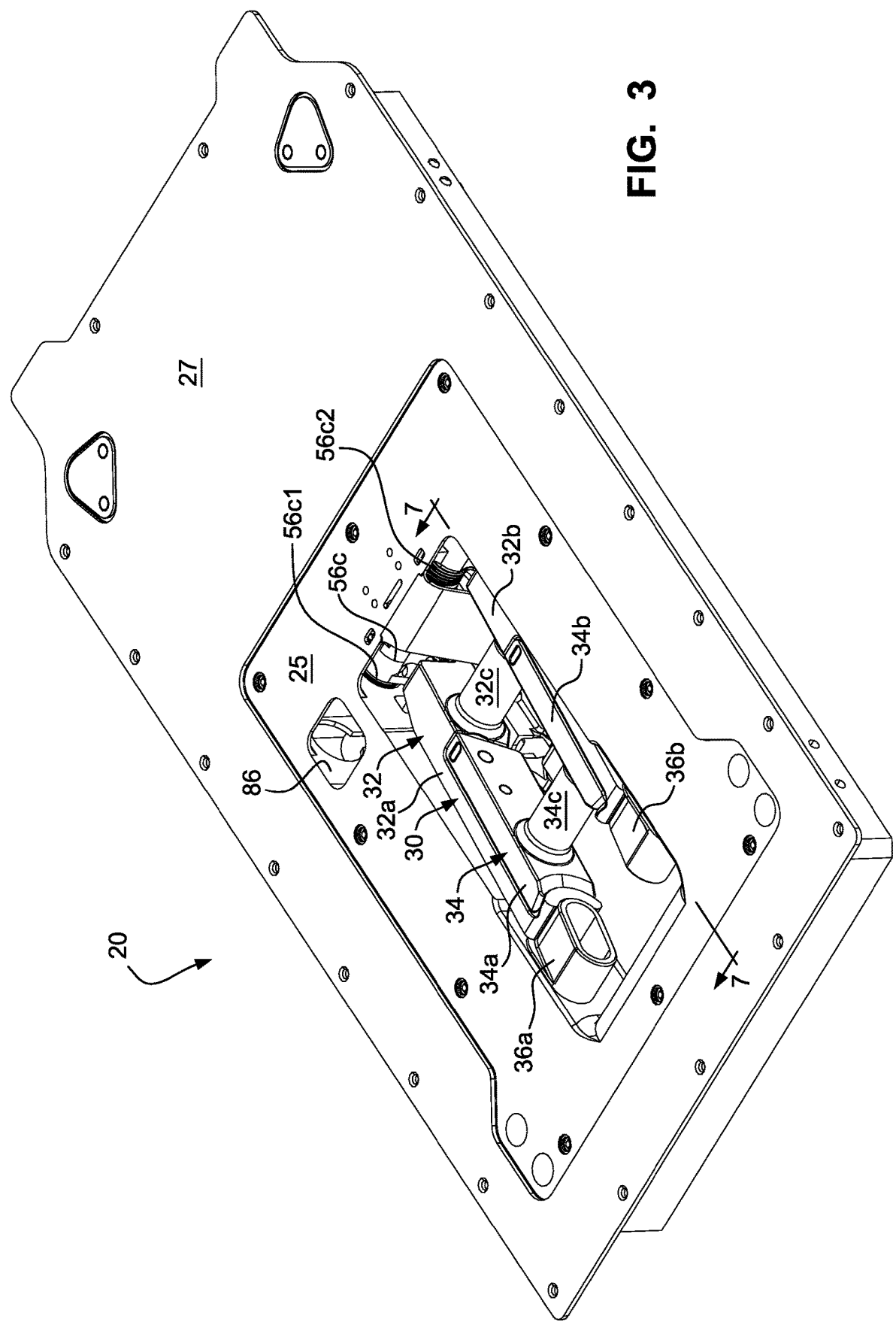
FIG. 3 is an enlarged top perspective view of the towplate assembly that is positionally fixed to the cargo deck of the cargo ramp.
Figure 4:
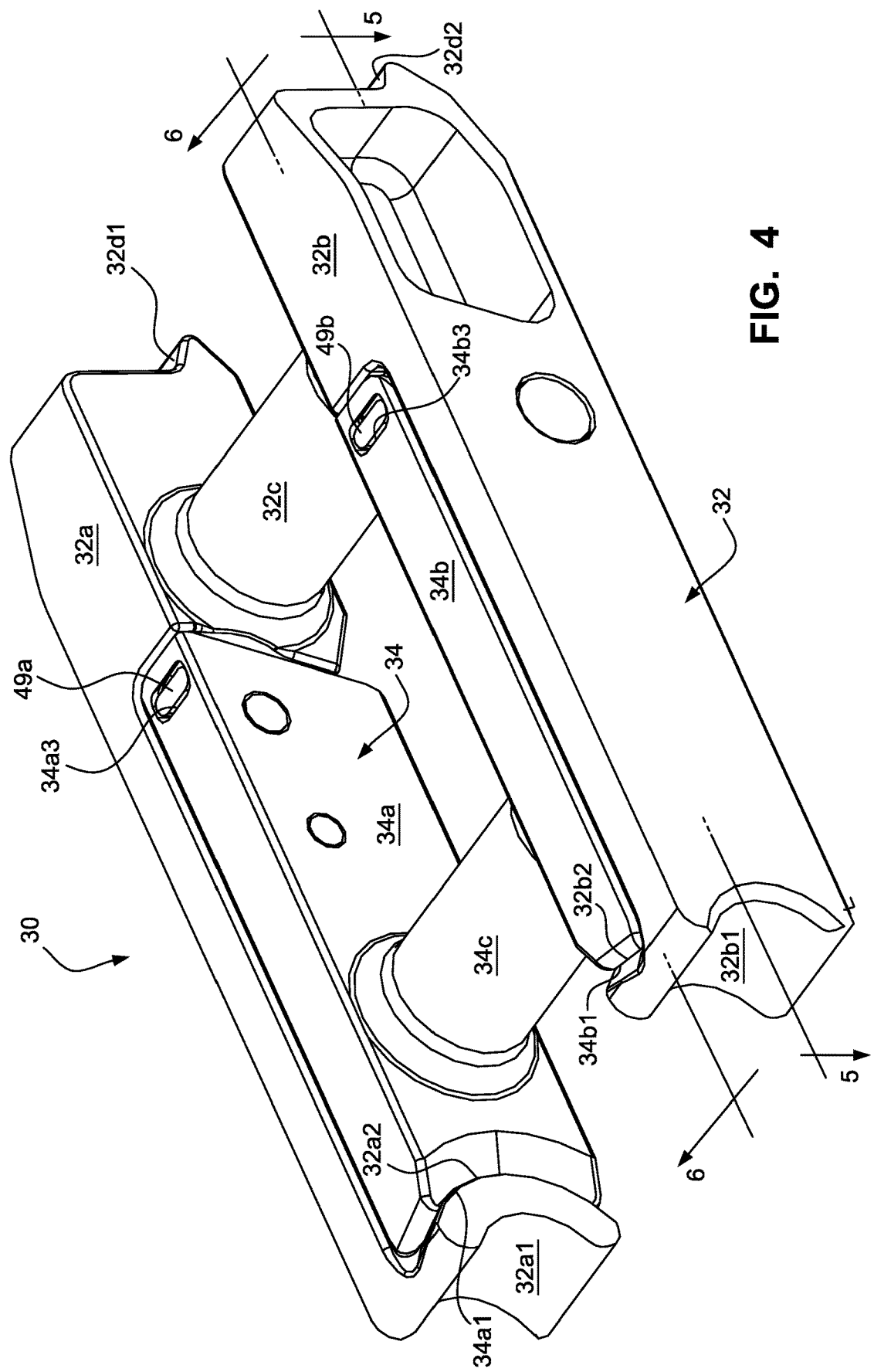
FIG. 4 is a perspective view looking aft of a towplate unit comprised of assembled jettison and extraction links that form a part of the towplate assembly depicted in FIG. 3.

The towplate unit 30 in accordance with an embodiment of the present invention that is an operative component part of the towplate assembly 20 is shown in greater detail in accompanying FIGS. 3 and 4. As shown, the towplate unit 30 includes an extraction link 32 and an expendable jettison link 34 nested within and removably coupled to the extraction link 32. The extraction link 32 includes a pair of laterally separated parallel extraction link arms 32a, 32b that are rigidly connected together by an extraction cross-connector 32c. Similarly, the jettison link 34 includes a pair of laterally separated parallel jettison link arms 34a, 34b that are nested within and removably connected to the extraction link arms 32a, 32b, respectively, as will be described in greater detail below. The jettison link arms 34a, 34b are rigidly connected together by a jettison cross-connector 34c. In use, the drogue chute line $DC_L$ will be connected to the jettison cross-connector 34c while the bridle line BL will be connected to the extraction cross-connector 32c.

The aft-facing end of the extraction link arms 32a, 32b include outer concavely arcuate surfaces 32a1, 32b1, respectively, which are adapted to engage with opposed convexly arcuate surfaces of the fixed-position inwardly protruding retaining bosses 36a, 36b (see FIG. 3) associated with the deck plate 25 when the towplate 30 is positioned therein. The aft-facing ends of the jettison link arms 34a, 34b of the jettison link 34 will likewise include outer concavely conically arcuate surfaces 34a1, 34b1 which engage with the adjacent inwardly facing convexly conically arcuate surfaces 32a2, 32b2 associated with the extraction link arms 32a, 32b, respectively. The conically arcuate surfaces 34a1, 34b1 and 32a, 32b cooperate during load transference from the jettison link 34 to the extraction link 32 (i.e., when the towplate unit 30 is under tension) so as to ensure that the extraction link 32 does not open in a lateral direction.

As is shown in FIGS. 5 and 6, the extraction link arms 32a, 32b are removably connected to the jettison link arms 34a, 34b by locking hook systems 40a, 40b, respectively.

Each of the locking hook systems 40a, 40b includes a locking link 42a, 42b pivotally moveable about a link pin 44a, 44b associated with the jettison link arms 34a, 34b. As representatively shown in FIG. 6, the locking link 42b includes a J-shaped latch end 46b which is adapted to lockably engage the fixed position locking pin 48b that rigidly extends inwardly from the extraction link arm 32b. Respective torsion springs 47a, 47b operably exert a bias force on the locking links 42a, 42b in a direction so as to maintain engagement of the locking links 42a, 42b with the associated locking pins (e.g., as representatively shown in FIG. 6 by the locking engagement between the locking link 42b and the locking pin 48b). Although not depicted, the locking link 42a will include similar cooperating structures as the locking link 42b shown in FIG. 6 but a mirror image thereof. An upper end of each of the locking links 42a, 42b will include jettison indicator bosses 49a, 49b that extend into jettison indicator windows 34a3, 34b3 near the proximal end of the jettison link arms 34a, 34b, respectively (see FIG. 4) so as to be visibly perceptible and thereby provide visual verification that the jettison link 34 is properly positioned and locked within the extraction link 32.

Figure 7:
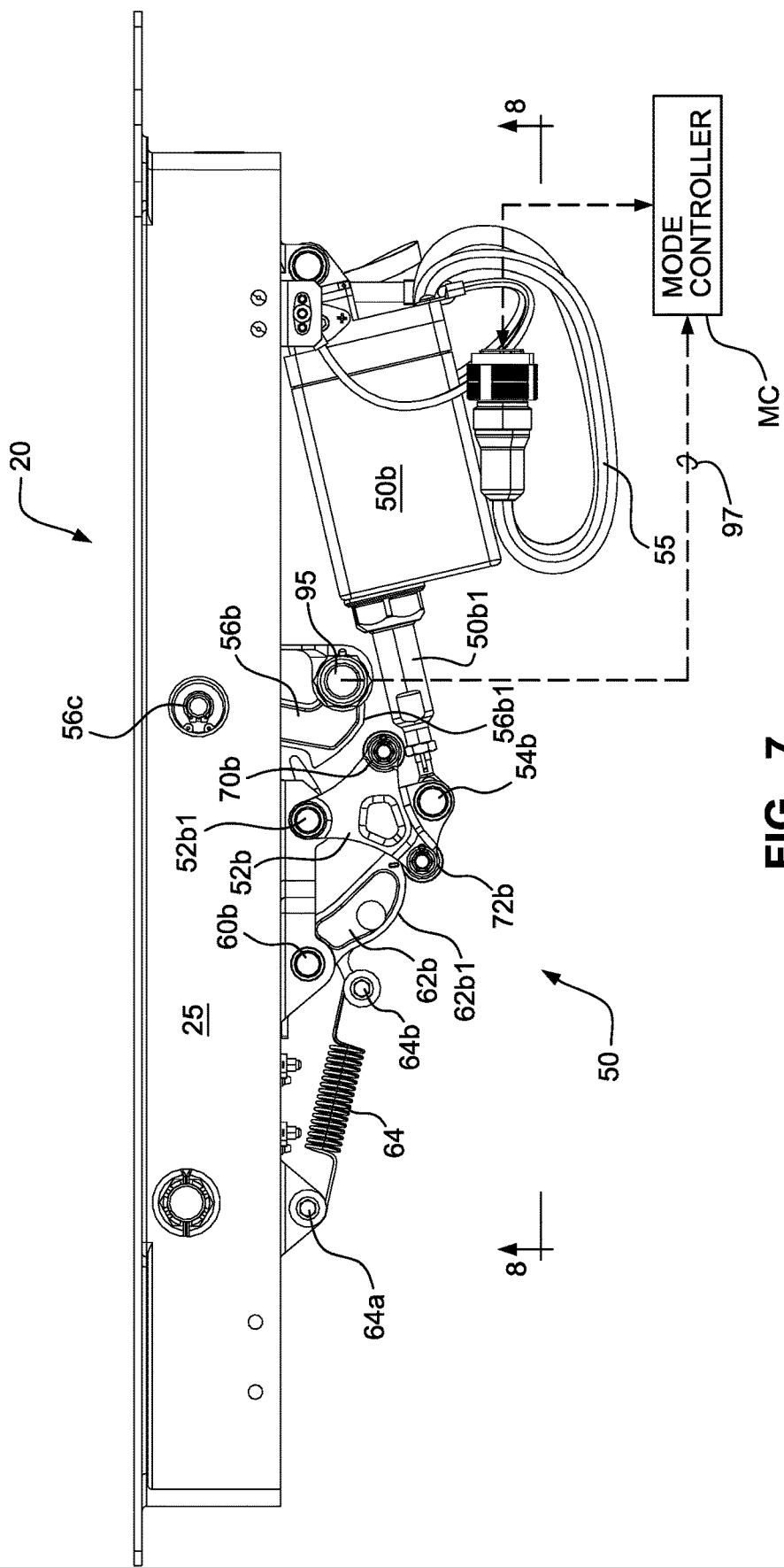
FIG. 7 is a side elevational view of the towplate assembly as taken along lines 7-7 in FIG. 3 showing actuator system thereof.
Figure 8:
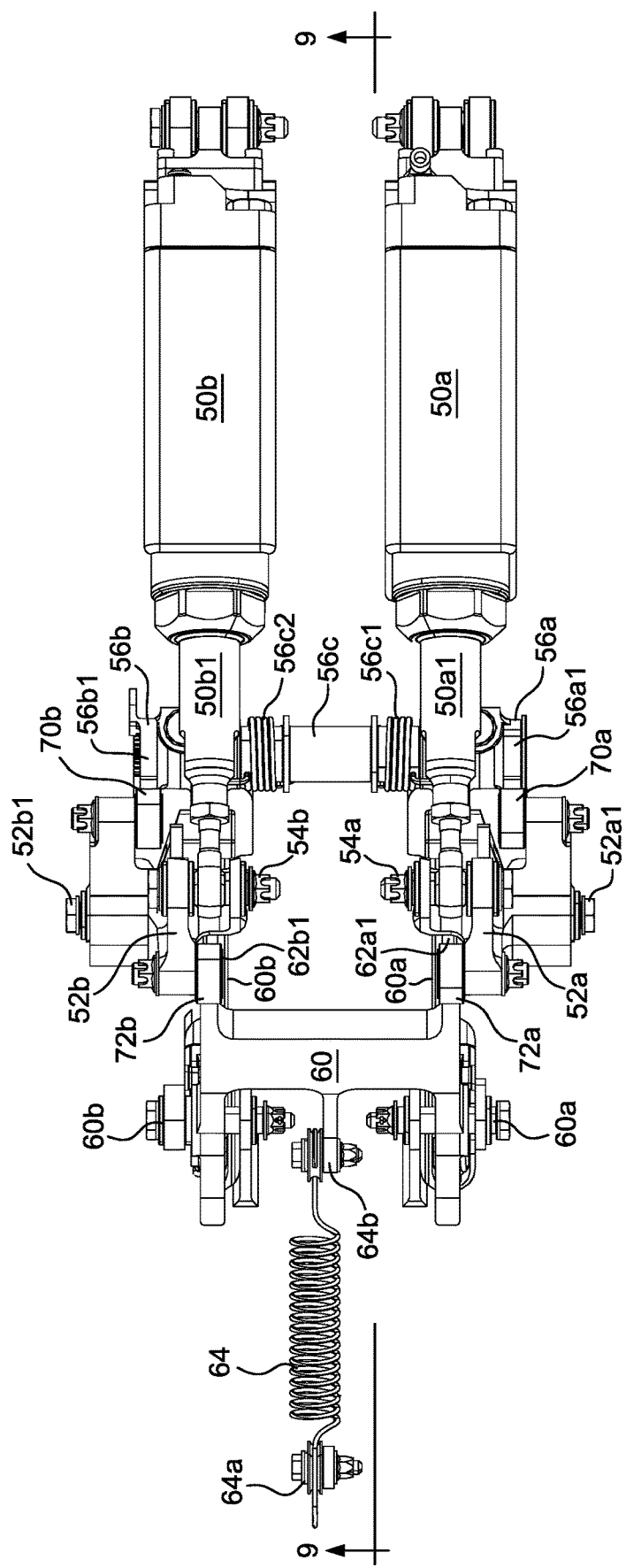
FIG. 8 is a bottom plan view showing the actuator system of the towplate assembly as taken along lines 8-8 in FIG. 7 and with the immovable components of the deck plate being removed for clarity of presentation.

An actuator control assembly 50 that is operably mounted outside the deck plate 25 of the towplate assembly 20 is shown in greater detail in accompanying FIGS. 7 and 8. As is shown, the actuator control assembly 50 includes a pair of electromechanical, hydraulic or pneumatic actuator cylinders 50a, 50b each having a respective rectilinearly operable actuator shaft 50a1, 50b1. The terminal ends of the actuator shafts 50a1, 50b1 are journally connected to bell cranks 52a, 52b via connector pins 54a, 54b, respectively. Each of the bell cranks 52a, 52b is mounted to the deck plate 25 by pivot shafts 52a1, 52b1 for pivotal movements thereabout (see FIG. 8). Each of the actuator cylinders 50a, 50b is operatively connected via a wiring harness 55 to an on-board mode controller MC to allow crew within the aircraft AC to operate the towplate assembly 20 during aerial cargo deployment operations, e.g., so as to allow deployment of the towplate unit 30 during a normal cargo deployment condition or to allow the jettison link 34 to be removed from the towplate unit 30 during an aborted cargo deployment condition.

A pair of tow link triggers 56a, 56b is mounted to the deck plate 25 by a trigger link shaft 56c. Torsion springs 56c1, 56c2 are operatively connected to the shaft 56c so as to exert a bias force thereon in a direction causing the tow link triggers 56a, 56b to be pivoted into engagement with the forwardly protruding latch surfaces 32d1, 32d2 (see FIG. 4) associated with the forward ends of extraction link arms 32a, 32b, respectively.

A jettison link arm 60 is pivotally mounted to the deck plate 25 aft of the bell cranks 52a, 52b by jettison link pivot pins 60a, 60b, respectively, and includes a pair of jettison link triggers 62a, 62b. A tension spring 64 is operatively connected between an aft connector 64a immovably associated with the deck plate 25 and a forward connector 64b associated with the jettison link arm 60 so as to exert a force on the jettison link arm 60 that pivots the jettison link triggers 62a, 62b in a direction that moves the jettison link triggers 62a, 62b into disengagement with the respective locking links 42a, 42b associated with the jettison link arms 34a, 34b (i.e., in a clockwise direction about the pivot pins 60a, 60b as viewed in FIG. 7). The bell cranks 52a, 52b carry respective extraction link rollers 70a, 70b and jettison link rollers 72a, 72b which are capable of engagement with the cam surfaces 56a1, 56b1 of the extraction link triggers 56a, 56b and the cam surfaces 62a1, 62b1 of the jettison link triggers 62a, 62b, respectively.

Figure 9:
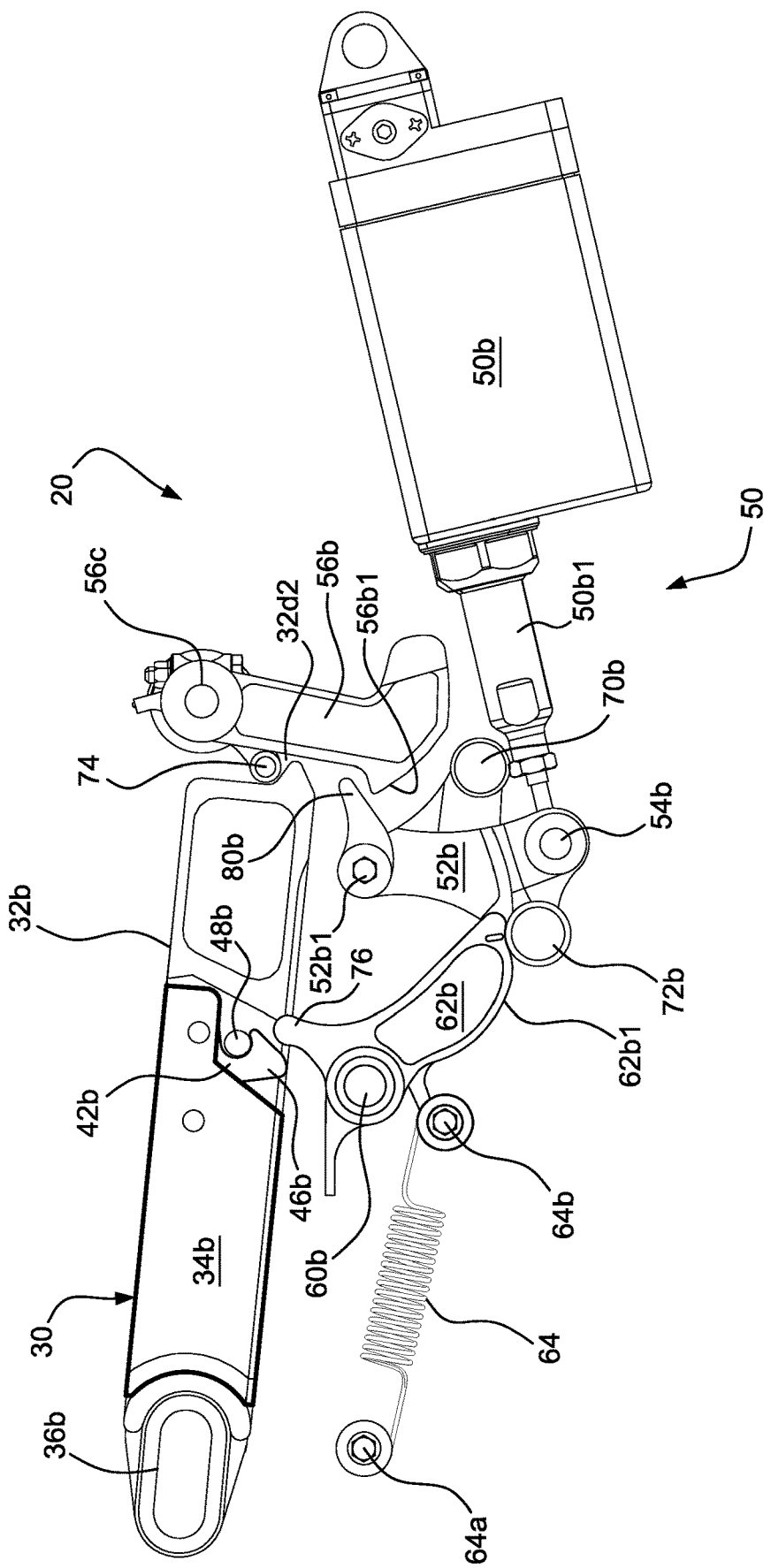
FIG. 9 is a cross-sectional elevational view of a representative portion of the actuator system shown in FIG. 8 as taken along lines 9-9 therein showing the towplate unit in a locked and ready condition.
Figure 10:
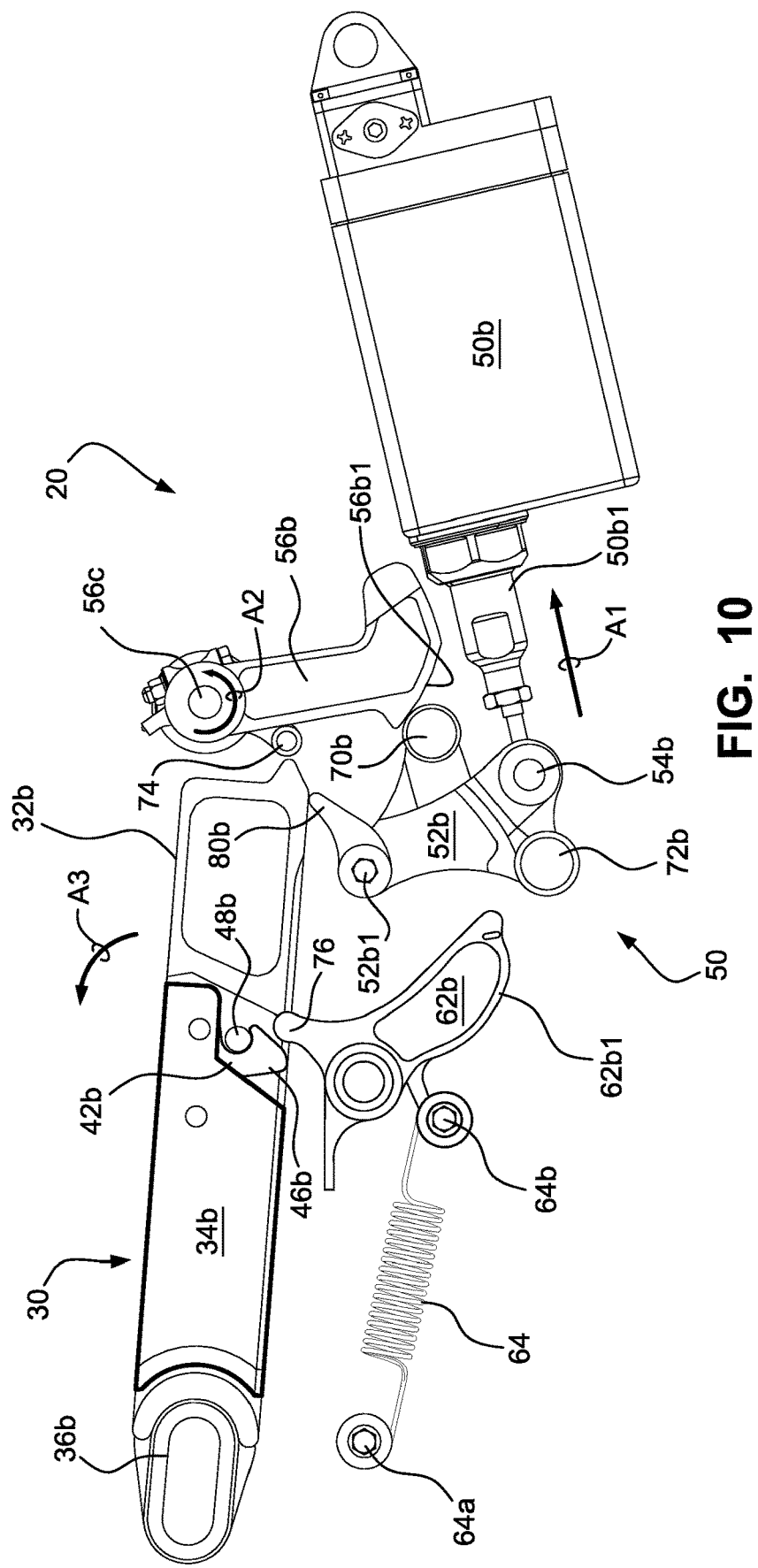
FIG. 10 is a view similar to FIG. 9 but showing the actuator system in an extraction condition whereby the towplate unit is released from the deck plate and allowed to exit the aircraft under the force of the drogue chute to thereby allow the attached cargo load to be extracted from the aircraft.
Figure 11:
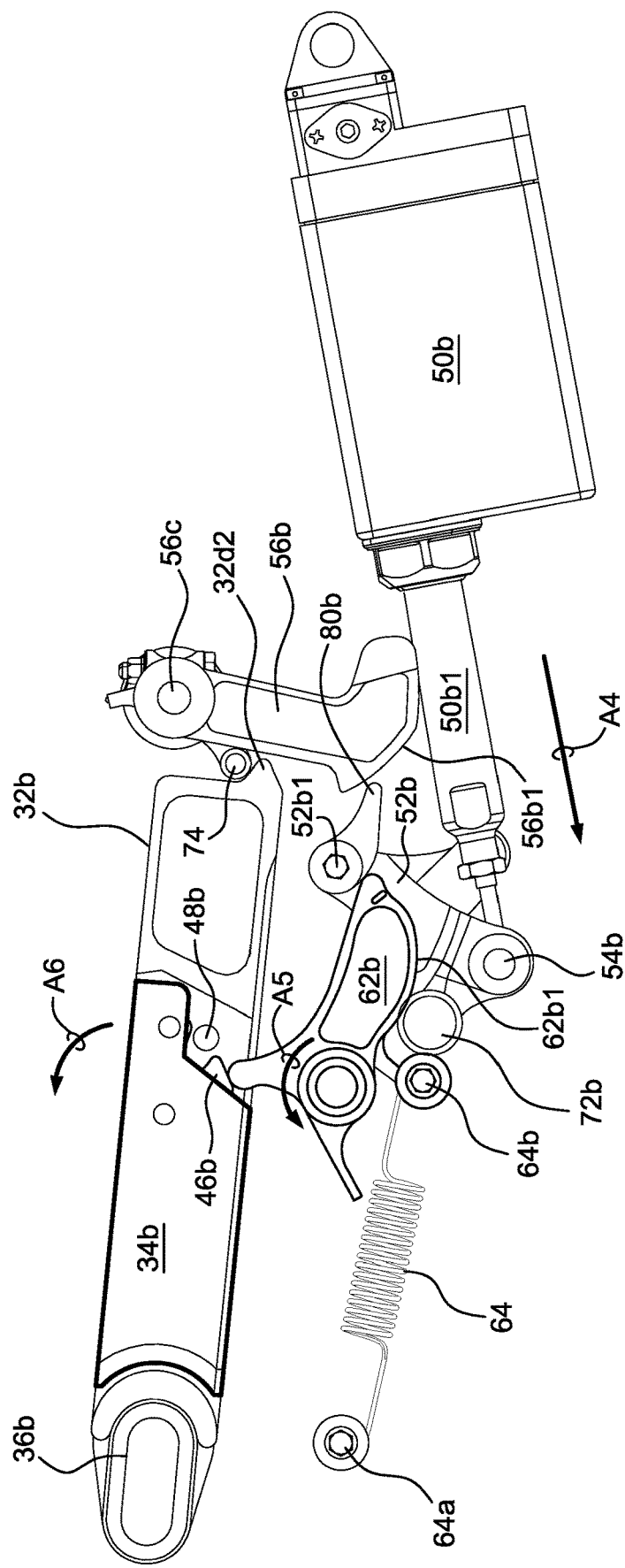
FIG. 11 is a view similar to FIG. 9 but showing the actuator system in a jettison condition whereby the jettison link of the towplate unit is released from the extraction link to allow the jettison link to exit the aircraft under the force of the drogue chute while the extraction link remains physically attached to the deck plate positioned in the cargo deck of the cargo door.

The operation of the towplate assembly 20 is shown by reference to accompanying FIGS. 9-11. In this regard, it will be understood that only the actuator cylinder 50b and its associated extraction and jettison link triggers 56b, 62b, respectively, are depicted in such Figures, the description which follows is equally applicable to the actuator cylinder 50a and its associated operational components. Thus, in the description which follows, the operational components associated with the actuator cylinder 50a will be parenthetically identified with the corresponding operational components shown in FIGS. 9-11 with regard to the actuator cylinder 50b.

Figure 2:
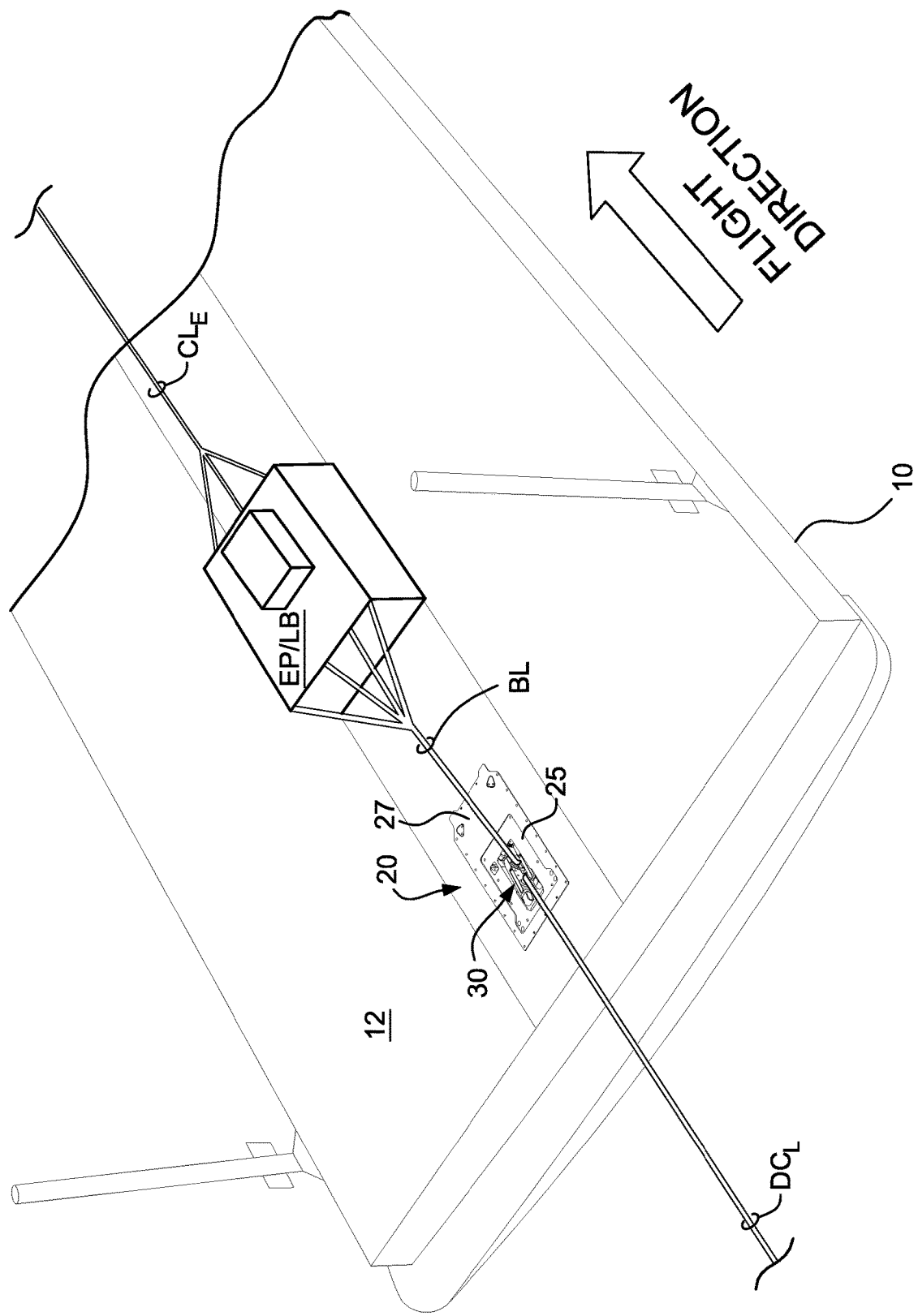
FIG. 2 is an enlarged partial top perspective view of the cargo ramp of the cargo aircraft shown in the opened position as depicted in FIG. 1.

The actuator system 50 is depicted in FIG. 9 in a locked and ready state, i.e., in a state whereby the towplate unit 30 is operatively attached to the drogue chute DC via the drogue chute line $DC_L$ and to the extraction parachute and line bag EP/LB via the bridle line BL which in turn is attached to the cargo load (not shown) via the cargo extraction line $CL_E$ (see also FIG. 2). It will be observed in FIG. 9 that while in such a locked and ready intermediate condition, the extraction trigger finger 74 associated with the tow link trigger 56b(56a) will be in locking engagement with the latch surface 32d2(32d1) associated with the extraction link arm 32b(32a). The torsion spring 56c2(56c1) will exert a bias force on the tow link trigger 56b(56a) so as to ensure that the extraction trigger finger 74 is in engagement with the latch surface 32d2(32d1). Further, the jettison trigger finger 76 associated with the jettison link trigger 62b(62a) will be in a disengaged relationship with respect to the latch end 46b(46a) of the locking link 42b(42a). While in such a state, the tension spring 64 will be exerting a bias force to pivot the jettison link trigger 62b(62a) in a direction so as to ensure disengagement between the jettison trigger finger 76 and the latch end 46b(46a).

When it is desired to extract the cargo load from the cargo aircraft CA, a crewmember may send an extraction command signal via the mode controller MC to operate the actuator 50b(50a) to cause the actuator system 50 to assume an extraction condition. Such a state is shown in FIG. 10. In this regard, upon receiving the extraction command signal from the mode controller MC, the actuator shaft 50b1(50a1) will be caused to linearly retract as shown by arrow A1 in FIG. 10. Such retraction of the actuator shaft 50b1(50a1) will in turn cause the extraction link roller 70b(70a) to engage the cam surface 56b1(56a1) of the extraction link trigger 56b(56a) forcing the extraction link trigger 56b(56a) to pivot against the force of the torsion spring 56c2 in a counterclockwise direction as shown by arrow A2 in FIG. 10. Such pivotal movement of the extraction link trigger 56b(56a) will in turn responsively disengage the extraction trigger finger 74 from the latch surface 32d2(32d1) thereby releasing the towplate unit 30 causing it to pivot upwardly against the retaining boss 36b(36a) of the deck plate 25 under the pulling force exerted by the drogue chute DC (arrow A3 in FIG. 10) by virtue of the interconnection via the drogue chute line $DC_L$ with the cross-connector 32c of the extraction link 32 thereby allowing the towplate unit 30 (i.e., both the extraction link 32 and the jettison link 34 nestably connected thereto) to separate from the deck plate 25 and exit the aircraft CA. The extracted towplate unit 30 will then in turn cause the extraction parachute associated with the extraction parachute and line bag EP/LB to deploy which then drags the cargo load from the cargo aircraft CA by virtue of the interconnection with the extraction parachute and the cargo extraction line $CL_E$. The extracted cargo load will thereafter deploy a main parachute to allow it to descend to the ground below.

In the event that the aerial deployment of the cargo load needs to be aborted so as to preclude the cargo load from being extracted from the aircraft, a crew member may send a jettison command signal from the mode controller MC to the actuator 50b. Such a jettison command signal will responsively cause the actuator system 50 to move from the locked and ready intermediate condition as shown in FIG. 9 to the jettison condition as shown in FIG. 11. Specifically, upon receipt of the jettison command signal, the actuator arm 50b1(50a1) will be caused to linearly extend as shown by arrow A4 in FIG. 11. Such extension of the actuator arm 50b1(50a1) will in turn cause the jettison link roller 72b (72a) to engage the cam surface 62b1(62a1) of the extraction trigger 62b(62a) forcing the extraction trigger 62b(62a) to pivot about the pivot pin 60b(60a) in a counterclockwise direction as shown by arrow A5 in FIG. 11. Pivotal movement of the extraction trigger 62b(62a) will in turn cause the jettison trigger finger 76 to engage with the latch end 46b(46a) of the locking link 42b(42a) thereby disengaging the latch end 46b(46a) from the locking pin 48b(48a) and thereby releasing the expendable jettison link 34 from its nested attachment to the extraction link 32. At this time, the jettison link 34 will be caused to pivot upwardly against the convexly curved surface 32b2(32a2) (arrow A6 in FIG. 11) under the pulling force of the drogue chute DC by virtue of the interconnection via the drogue chute line $DC_L$ with the cross-connector 34c of the jettison link 34. The jettison link 34 will thereby exit the aircraft CA while the extraction link 32 remains in locked position within the deck plate 25.

Each of the bell cranks 52a, 52b may include an anti-jamming finger 80a, 80b. As is more specifically shown in FIGS. 12A, the anti-jamming finger 80a associated with the bell crank 52a is in spaced relationship with the forward end of the extraction link 32a of the towplate unit 30 when the towplate assembly is in the locked and ready condition (e.g., the intermediate condition shown by FIG. 9 discussed hereinabove). However, as is shown in FIG. 12B, upon actuation of the actuator system 50 so as to pivotally move the bell crank into the extraction condition (e.g., the condition shown by FIG. 10 discussed hereinabove), the anti-jamming finger 80b will be moved into contact with the forward end of the extraction link arm 32a thereby applying an upward force onto the extraction link 32. Such upward force on the extraction link 32 by the anti-jamming fingers 80a, 80b will therefore further encourage the entire towplate unit 30 to be extracted from the deck plate 25 so it can exit the aircraft CA as described previously.

Figure 13B:
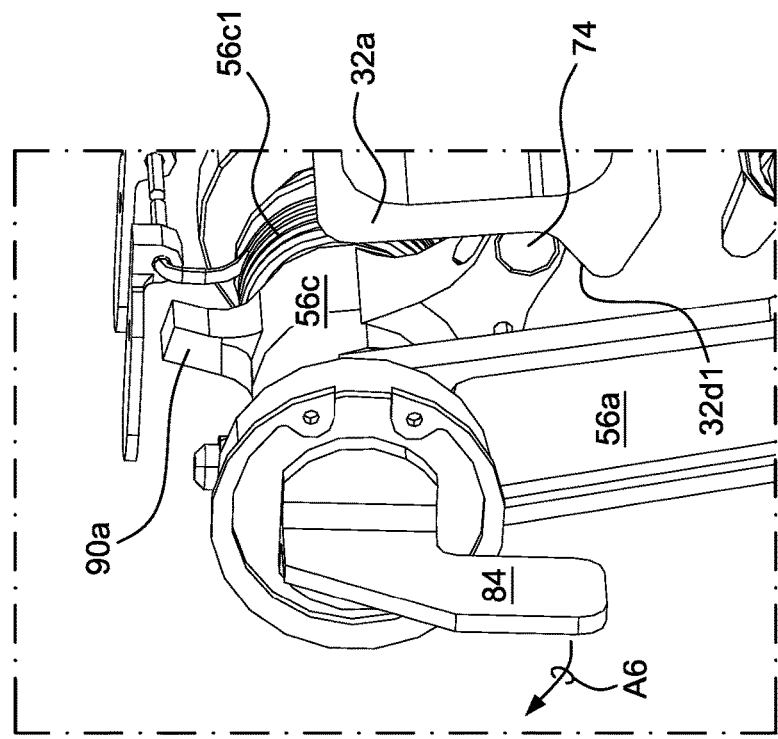
FIGS. 13A and 13B are top plan and enlarged perspective views, respectively, showing a manually operable release system of the towplate assembly to allow manual removal/installation of the towplate unit.
Figure 13A:
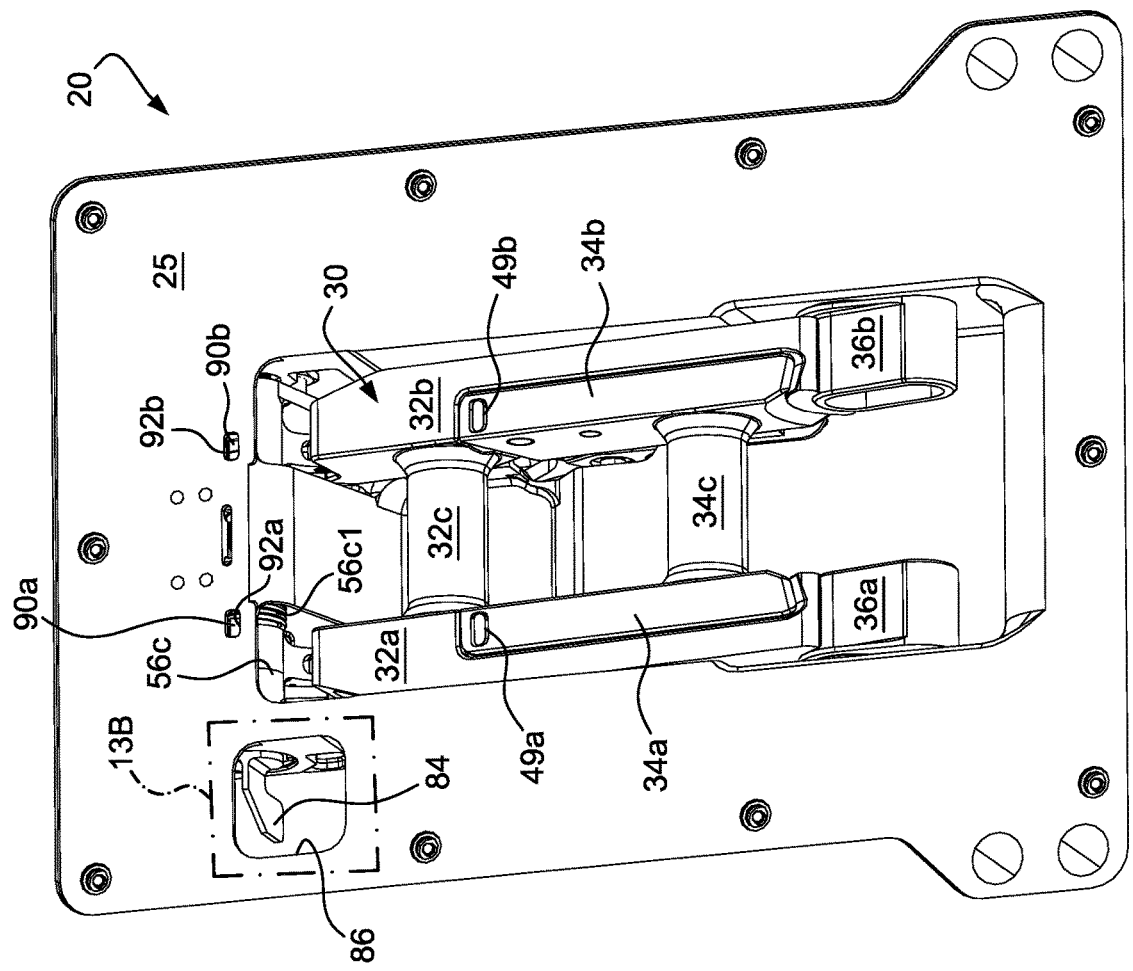

FIGS. 13A and 13B depict a manually operable release system that may be employed in the towplate assembly 20. As shown, the release system will include a manually operable handle 84 that is rigidly connected to the trigger link shaft 56c and is accessible through an access window 86 formed in the top plate of the deck plate 25. Manual movement of the handle 84 in a clockwise direction as shown by arrow A6 in FIG. 13B will thereby rotate the shaft 56c so as to disengage the extraction trigger fingers 74 associated with the extraction triggers 56a, 56b from the latch surfaces 32d1, 32d2. Such disengagement will therefore allow the towplate unit 30 to be removed from the deck plate 25 or allow a new towplate unit 30 to be installed for a cargo extraction operation. Release of the handle 84 will cause it to pivot counter to the direction of arrow A6 under the bias force exerted on the shaft 56c by the torsion springs 56c1, 56c2 and thereby return to its locked and ready condition.

Figure 14B:
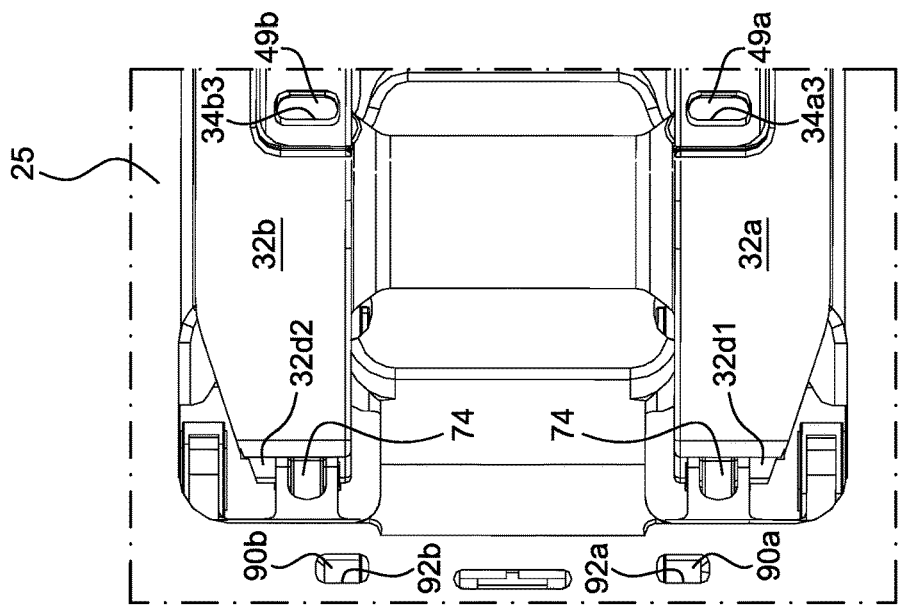
FIGS. 14A and 14B are overall top plan and enlarged plan views, respectively, of a visual indication system to allow visual verification that the towplate unit is correctly installed and that the jettison and extraction links are properly assembled and locked.
Figure 14A:
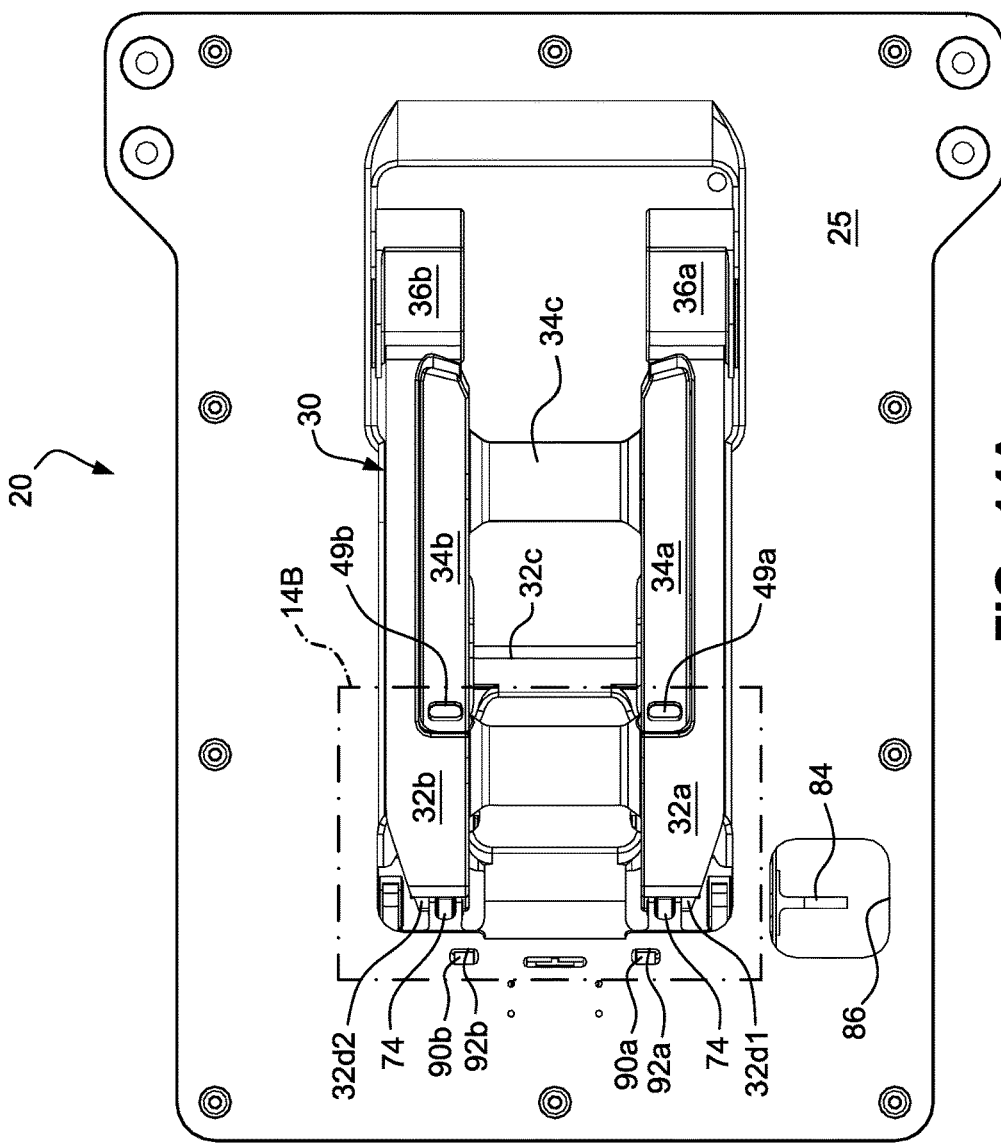

As noted previously, visual verification that the jettison link 34 is properly positioned and locked within the extraction link 32 is provided by jettison indicator bosses 49a, 49b associated with the locking links 42a, 42b that extend into jettison indicator windows 34a3, 34b3 near the proximal end of the jettison link arms 34a, 34b, respectively (see FIG. 4). As is shown in FIGS. 14A and 14B, the shaft 56c may also be provided with a pair of towplate indicator bosses 90a, 90b that protrude upwardly from the shaft 56c such that the terminal ends thereof are visibly perceptible in towplate indicator windows 92a, 92b formed in the top plate of the deck plate 25. Thus, when all of the indicator bosses 49a, 49b and 90a, 90b are visible within their respective windows 34a3, 34b3 and 92a, 92b, there will be a visual confirmation that the towplate unit of the towplate assembly 20 is physically positioned within the deck plate 25 and in a locked and ready condition for deployment of a cargo load as described above.

Figure 15:
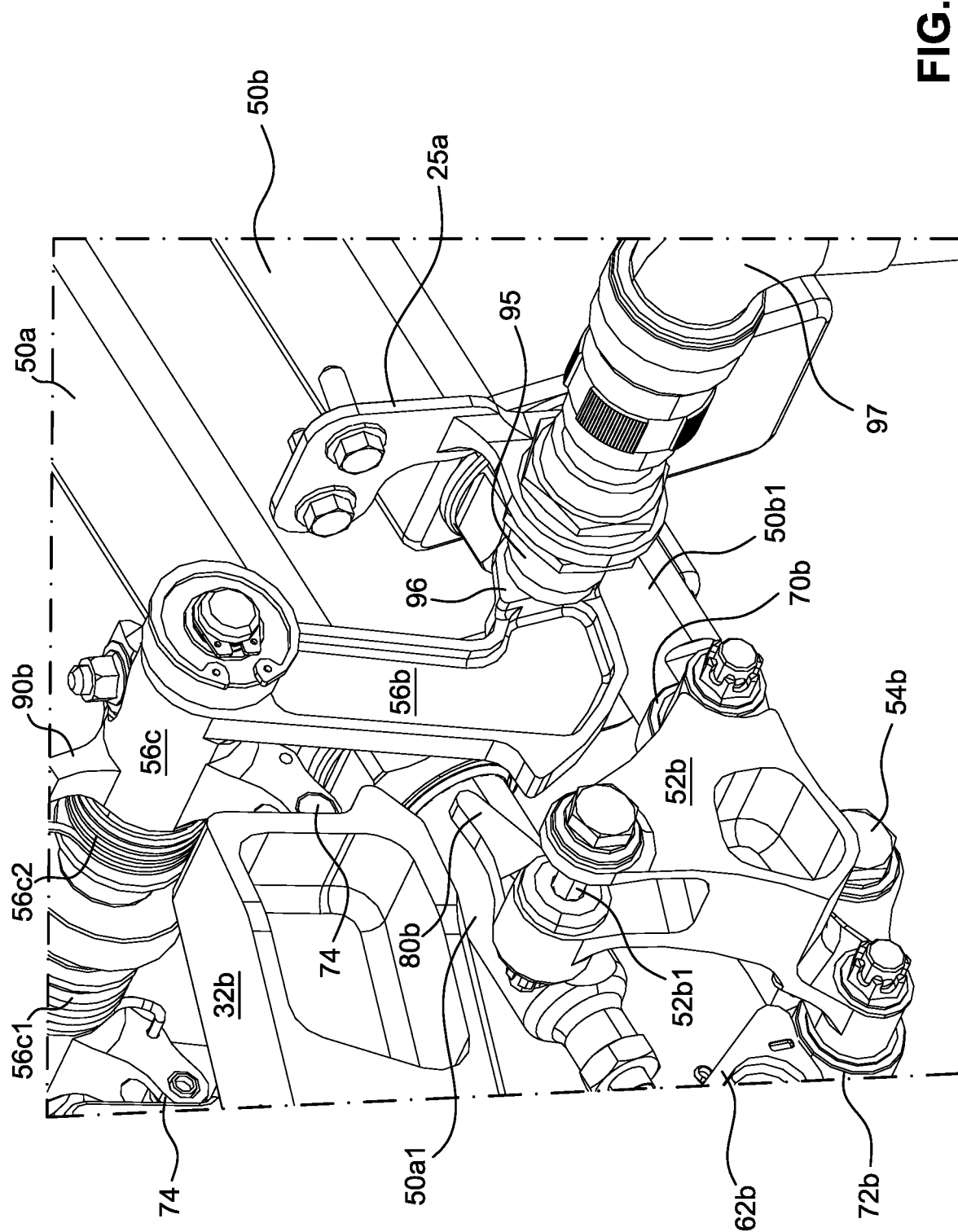
FIG. 15 is an enlarged perspective view of a proximity sensor that may be employed to monitor condition status of the towplate assembly.

FIG. 15 shows in greater detail a proximity sensor 95 that may be fixed to the deck plate 25 via bracket 25a so as to monitor the positional conditions of the actuator system 50 associated with the towplate assembly 25. In this regard, the proximity sensor 95 is operatively positioned via the bracket 25a so as to be capable of sensing the positional proximity of a sensor flange 96 associated with the extraction trigger 56b. Proximity signals from the sensor 95 may be electronically communicated to the mode controller MC via electrical cable 97 (see also the schematic representation thereof in FIG. 7). The proximity sensor may therefore send a position signal indicating a "on" state when the towplate unit 30 is installed and locked due to the direct opposing alignment of the sensor 95 and the sensor flange 96. Such a state is shown in FIG. 16A. However, in a state whereby the towplate unit 30 is installed and unlocked as shown in FIG. 16B or a state whereby the towplate unit 30 is uninstalled (FIG. 16C) or missing, the sensor 95 and the sensor flange 96 will be misaligned due to the pivotal movement of the extraction trigger 56b about shaft 56c, in which case a signal indicating an "off" state will be transmitted. The mode controller MC may therefore include a suitable visual indicator which provides an indication of such "on" and "off" states so that the onboard crew monitoring the towplate assembly 20 may take appropriate action when needed.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A towplate unit to assist in aerial extraction of a cargo load from an airborne aircraft, the towplate unit comprising:
   an extraction link which includes a pair of spaced-apart parallel extraction link arms and an extraction cross-connector extending between and rigidly joining the extraction link arms, the extraction cross-connector being adapted for connection with a cargo extraction line attached to a cargo load to be extracted from the airborne aircraft;
   a jettison link which includes a pair of spaced-apart parallel jettison link arms each nested within a respective one of the extraction link arms, and a jettison cross-connector extending between and rigidly joining the jettison link arms rearwardly of the extraction cross-connector, the jettison cross-connector being adapted for connection with a drogue parachute line associated with a drogue parachute being towed by the airborne aircraft; and a locking system adapted to removably lock the jettison link to the extraction link and to allow the jettison link to be removed from the extraction link when unlocked, wherein the locking system comprises:
  (i) at least one locking link pivotally connected to a respective jettison link arm; and
  (ii) at least one locking pin rigidly associated with a respective extraction link arm, wherein
the at least one locking link is pivotally moveable between a locked condition such that the at least one locking link is lockably engaged with the at least one locking pin so that the extraction and jettison links are connected to one another, and an unlocked condition such that the at least one locking link is disengaged with the at least one locking pin to thereby allow separation of the jettison link from the extraction link.

2. The towplate unit according to claim 1, wherein
the extraction link arms include an aft-facing end which defines an inner convexly conically curved surface, and wherein
the jettison link arms include an aft facing end which defines an outer concavely conically curved surface which is engaged with the inner convexly conically curved surface of a respective one of the jettison link arms.

3. The towplate unit according to claim 2, wherein the aft-facing end of the extraction link arms further defines an outer concavely curved surface.

4. The towplate unit according to claim 1, wherein the locking system comprises:
  (i) a pair of locking links each pivotally connected to a respective one of the jettison link arms; and
  (ii) a pair of locking pins each being rigidly associated with a respective one of the extraction link arms, wherein
  each locking link is pivotally moveable between the locked condition such that the locking link is lockably engaged with a respective one of the locking pins so that the extraction and jettison links are connected to one another, and the unlocked condition such that each the locking link is disengaged with the respective one of the locking pins to thereby allow separation of the jettison link from the extraction link.

5. The towplate unit according to claim 4, wherein
each of the jettison link arms includes an indicator window, and wherein
each of the locking links includes an indicator boss extending into a respective one of the indicator windows so as to provide a visual verification that the locking link is in the locked condition thereof.

6. The towplate unit according to claim 1, wherein
the at least one locking link includes a J-shaped hook latch end lockably engaged with the at least one locking pin, and wherein
the locking system further comprises a spring element for exerting a bias force on the J-shaped hook latch end in a direction to pivot the J-shaped hook latch end into the engaged position thereof with the locking pin.

7. The towplate unit according to claim 6, wherein the spring element is a torsion spring.

8. The towplate unit according to claim 1, wherein
at least one of the jettison link arms includes an indicator window, and wherein
the at least one locking link includes an indicator boss extending into the indicator window of the at least one of the jettison link arms so as to provide a visual verification that the at least one locking link is in the locked condition thereof.

9. The towplate unit according to claim 1, wherein the extraction link arms include forwardly protruding latch surfaces.

10. A towplate assembly for aerial extraction of cargo from an airborne aircraft comprising:
  a deck plate adapted to being immovably mounted to a cargo deck of the aircraft;
  the towplate unit according to claim 1 operatively associated with the deck plate;
  an actuator control assembly removably locking the towplate unit to the deck plate, wherein the actuator control assembly is interconnected to the towplate unit so as to be operatively movable between (i) a cargo extraction state which causes the towplate unit to separate from the deck plate during a normal cargo deployment condition or (ii) a jettison state wherein the at least one locking link is pivotally moved from the locked condition and into the unlocked condition thereof to thereby cause the jettison link to separate from the extraction link of the towplate unit.

11. The towplate assembly according to claim 10, wherein the actuator control system comprises:
  an actuator cylinder which includes an actuator shaft that is reciprocally rectilinearly moveable from an intermediate position and into retracted and extended positions;
  a bell crank operatively connected to a terminal end of the actuator shaft so as to be pivotally moveable between a towplate unit release position and a jettison link release position in response to movement of the actuator shaft between its retracted and extended positions, respectively;
  a pivotal extraction link trigger operatively engaged with the extraction link of the towplate unit so as to removably lock the towplate unit to the deck plate; and
  a jettison link trigger adapted to being pivotally moved into contact with the locking system associated with the jettison link of the towplate unit to unlock the jettison link from the extraction link, wherein
  movement of the actuator shaft into the retracted position responsively causes the bell crank to pivot into the towplate unit release position and engage with the extraction link trigger so as to pivotally move the extraction link trigger to unlock the towplate unit from the deck plate and thereby allow the towplate unit to be separated therefrom, and wherein
  movement of the actuator shaft into the extended position responsively caused the bell crank to pivot into the jettison link release position and engage with the jettison link trigger so as to pivotally move the jettison link trigger into contact with the locking system to thereby unlock the jettison link from the extraction link to allow the jettison link to be separated therefrom.

12. The towplate assembly according to claim 11, wherein the extraction link trigger includes:
  an extraction trigger link shaft for mounting the extraction link trigger for pivotal movements between engaged and disengaged positions relative to the extraction link, and
  a torsion spring operatively associated with the trigger link shaft for exerting a bias force to move the extraction link trigger into the engaged position thereof.

13. The towplate assembly according to claim 12, wherein
the extraction trigger link shaft includes a handle to allow manual rotation of the trigger link shaft and thereby cause the extraction trigger link to be manually pivoted between the engaged and disengaged positions thereof, and wherein
the deck plate includes an access window to allow manual access to the handle.

14. The towplate assembly according to claim 12, wherein
the extraction trigger link further includes a sensor flange, and wherein
the actuator control system further comprises a proximity sensor to sense relative positional proximity of the sensor flange to provide position information indicative of whether or not the extraction trigger link is removably locked with the towplate unit.

15. The towplate assembly according to claim 11, wherein
the extraction link trigger includes an extraction link cam surface,
the jettison link trigger includes a trigger link cam surface, and
the bell crank includes an extraction link roller and a jettison link roller engageable with the extraction link cam surface and the trigger link cam surface in response to the bell crank being pivotally moved into the towplate unit release position and the jettison link release position, respectively.

16. The towplate assembly according to claim 11, wherein the actuator control system further comprises a tension spring operatively connected to the jettison link trigger to cause the jettison link trigger to be moved pivotally into a disengagement relative to the locking system.

17. The towplate assembly according to claim 11, wherein
at least one of extraction link arms includes a forwardly protruding latch surface, and wherein
the extraction trigger link includes an extraction trigger finger engaged with the latch surface to removably lock the towplate unit to the deck plate, wherein
pivotal movement of the bell crank into the towplate unit release position responsively causes the extraction trigger link to pivot so as to disengage the extraction trigger finger and the latch surface.

18. The towplate assembly according to claim 11, wherein
the bell crank includes an anti-jamming finger which is adapted to contact a forward end of the extraction link when the bell crank is moved into the towplate unit release position to thereby ensure that the towplate unit separates from the deck plate.

19. The towplate assembly according to claim 11, wherein
the deck plate includes a towplate indicator window, and wherein
the extraction link trigger includes a towplate indicator boss which protrudes upwardly into the towplate indicated window so that a terminal end is visible when the extraction link trigger is engaged with the extraction link.

20. A cargo aircraft which includes a cargo door and the towplate assembly according to claim 11 operatively associated with the cargo door.

* * * * *